Dec. 13, 1932.   A. L. MILLER ET AL   1,891,185
GAUGE DEVICE
Filed Aug. 17, 1928   2 Sheets-Sheet 2
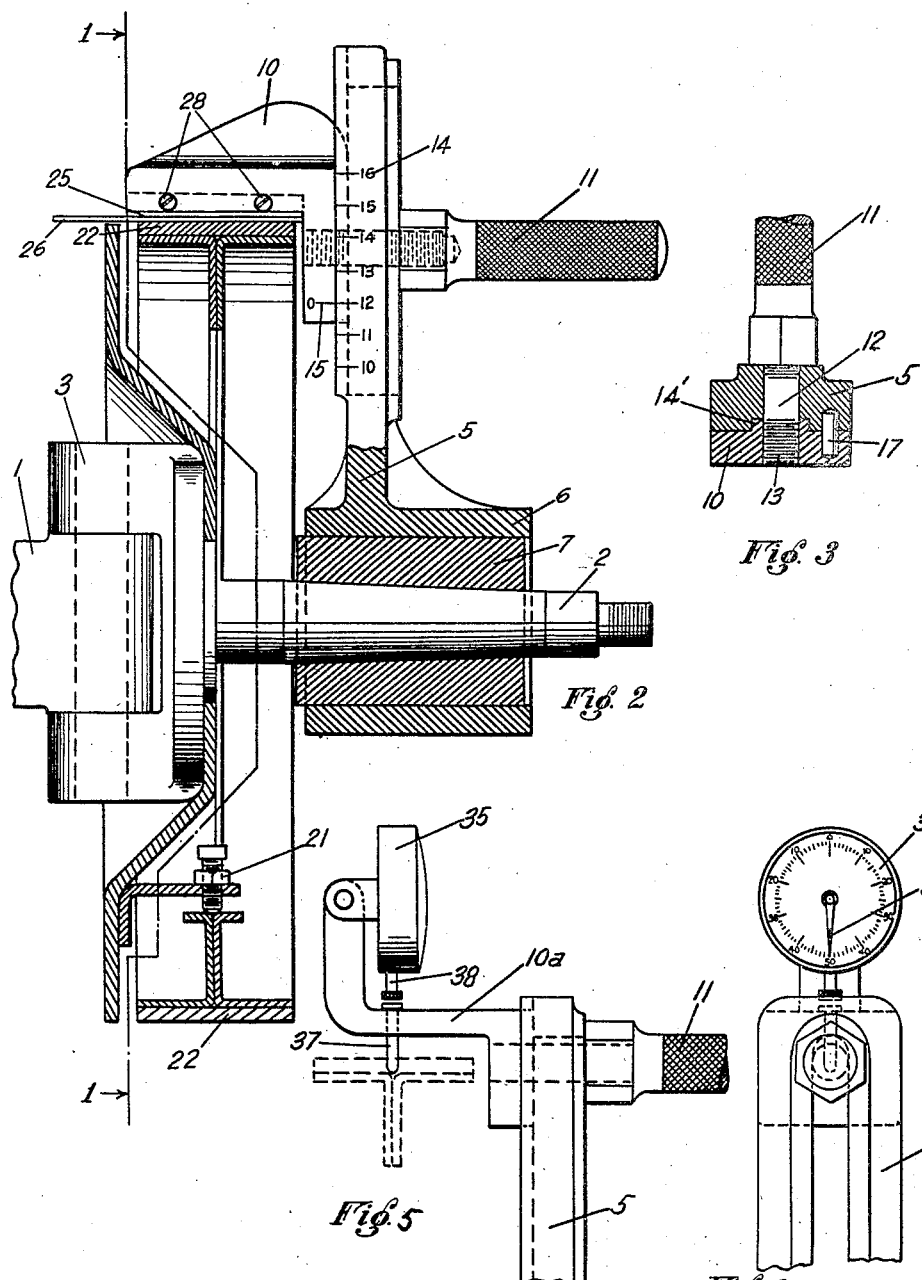
INVENTORS
Alvin L. Miller.
Russell H. Miller.
BY
ATTORNEY.

Patented Dec. 13, 1932

1,891,185

UNITED STATES PATENT OFFICE

ALVIN L. MILLER AND RUSSELL H. MILLER, OF DETROIT, MICHIGAN

GAUGE DEVICE

Application filed August 17, 1928, Serial No. 300,168, and in Canada June 14, 1929.

This invention relates to a gauge device for the brakes of automotive vehicles, and has to do particularly with a gauge which can be used for brakes of various sizes.

It is well known that brakes for automotive vehicles are made in various sizes depending upon the size or weight of the vehicle, or the desires of the manufacturer, and even a single manufacturer who produces passenger automobiles of different sizes and also commercial vehicles may use as many different sized brakes. In referring to size, the diameter of the braking drum is meant.

Heretofore it has been the practice to use a separate gauge in the form of a dummy brake drum for installing or for replacing or adjusting the brakes and this, of course, required the use of quite a large number of the dummy drums. The object of the invention, therefore, is to produce a brake gauge which is applicable for use in installing brakes, replacing the brake lining, or adjusting brakes over a large range of sizes.

In the accompanying drawings:

Fig. 2 is a sectional view taken on line 2—2 of Fig. 1.

Fig. 3 is a detail sectional view taken on line 3—3 of Fig. 1.

Fig. 4 is a view illustrating another modified form equipped with an indicating gauge.

Fig. 5 is a partial side elevation of the form shown in Fig. 5.

Figure 1:
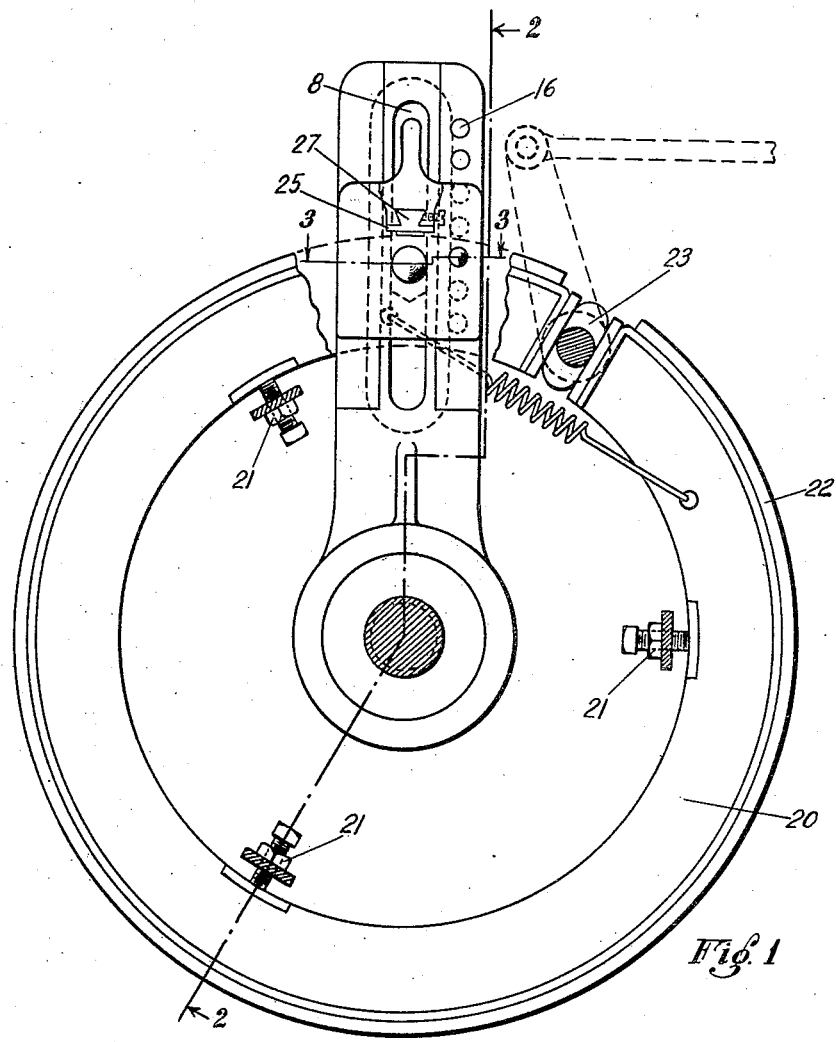
Fig. 1 is an elevational view illustrating the gauge in operative position as regards a brake mechanism.

The drawings herewith illustrate a brake construction as applied to the front wheel of a vehicle, the front axle being shown at 1, the wheel spindle at 2, which is connected to the axle by a steering knuckle 3. The tool of course is also usable for the driving axle.

The tool consists of a body part 5 having a sleeve portion 6 for fitting over the spindle. Inasmuch as the spindles vary in size, an adaptor 7 is provided. A number of these adaptors will be supplied with the single tool the adaptors being made to fit over the spindles or the end of the axle shaft of different sizes, and each having an exterior diameter the same and which fits within the portion 6. The body of the gauge extends radially from the portion 6 and it is provided with an elongated slot 8. On one side of the body there is disposed a gauge head 10 and on the opposite side is a handle 11 supplied with the screw threaded stud which extends through the slot and which is screw threaded into the head as at 13. Preferably the gauge head 10 and body 5 have a tongue groove engagement as at 14'.

It will be apparent therefore, that the handle and head can be moved lengthwise in the slot, but the head is prevented from relative rotation by the tongue groove connection. The body is provided with suitable indicia 14 arranged lengthwise of the slot for showing the correct location of the gauge head for a particular sized brake. The head has corresponding index 15. Thus to adjust the gauge head the handle and head may be loosened by the turning of the handle and the two may be moved longitudinally in the slot until the desired position is attained, whereupon the handle may be tightened so that the head and handle are in proper position. As shown in Fig. 2 the head is positioned for gauging a twelve inch brake.

For the purpose of providing a positive location for the head, the body of the gauge is provided with a plurality of recesses 16 and the head is provided with a pin 17 adapted to fit into any one of the recesses. There is a recess in the body of the gauge for each size of brake drum shown by the indicia 14. Accordingly, to adjust for a twelve inch brake, for example, the pin 17 projects into the proper recess to hold the index 15 in alignment with numeral 12.

In the drawings, there is depicted a brake of the internal expanding type consisting of a brake shoe 20 with adjusting devices 21 and applied to the brake shoe is the brake band 22. The particular construction of the brake mechanism is not essential inasmuch as the tool is useful for all kinds of brake constructions and the present showing is for exemplary purposes only. Brakes of this type are applied by expanding the shoe against the interior walls of a drum (not shown) as by means of a cam device 23.

In using this tool, the same is placed upon the spindle or axle shaft after the manner shown in Fig. 2. This is done after the wheel with brake drum attached thereto has been removed, or in the case of original equipment before the wheel has been applied. At this time, the gauging face 25 of the head 10 is in a position which corresponds to the interior surface of the drum which has been removed. A feeler gauge 26 may now be placed between the gauging face 25 and the brake band 22 as shown in Fig. 2. This feeler gauge is of a thickness which corresponds to the clearance which is desired between the brake band and the drum. The brake shoe is now adjusted at this point, whereupon the tool may be rotated on the spindle so that the brake band can be adjusted at all points throughout its circumference. This having been done, the tool is removed and when the wheel is applied the brake band is adjusted correctly, as regards the brake drum.

The gauge surface 25 may be provided on the head 10 by means of a separate removable piece 27 which may be dove-tailed to the head and held in position by screws 28. On the other hand, the head 10 may be accurately machined at this point instead of providing the separate piece 27. Where however, the gauge is to be used with a brake which employs a brake band composed of material which is preformed to proper shape as by means of moulding or the like, as distinguished from the more commonly known woven fabric type of brake band, it is desirable to equip the gauge with a blade for shaving off high spots in the band. In this new type of brake band alluded to, the obtaining of correct adjustment is more difficult than it is with the woven band, and even after the brake mechanism has been adjusted as nearly correct as possible there may be high spots in the brake band.

The gauge device 27 may be removed from the head by loosening the screws 28 and sliding the device out from the end of the head 10, whereupon a similarly shaped cutting device or knife 30 having a cutting edge 31 may be inserted. The gauge may again be suitably rotated and the cutting edge will shave off high spots in the brake band as depicted in Fig. 4.

In the modified form shown in Figs. 4 and 5, the gauge is equipped with an indicator 35 having a pointer 36. This indicator is mounted on a head 10a which takes the place of the head 10. This head 10a is provided with a plunger 37. The head 10a together with the handle is mounted on the body 5 and may be adjusted relative to the body in a manner identical to that above described.

With this modified form properly adjusted and placed upon the wheel spindle or shaft the plunger 37 rests upon the surface of the brake band. The plunger is movable in the head 10a and when it rests upon a properly adjusted brake band it is raised up against the stem 38, which actuates the pointer so that the pointer assumes the position at zero on the dial of the indicator 35. This indicator may employ such internal mechanism as is conventional in devices of this nature. Preferably the pointer assumes a normal position away from the zero point as for example at the point 50.

When this gauge is applied, the brake band is adjusted to bring the pointer to zero and as the gauge is rotated around, the pointer 36 will fluctuate from one side of the zero point to the other, thus indicating high spots or low spots in the band. Correct adjustment is attained when there is no fluctuation of the pointer 36 and the same stands at zero at all points where the plunger 36 rests upon the brake band.

What we claim is:

1. A gauge device for use in adjusting brakes of an automotive vehicle, comprising a rigid elongated body member adapted to be rotatably mounted upon a wheel spindle, said body member being provided with an elongated longitudinally extending slot, a gauging head on one side of said body member and overlying the adjacent brake band, a handle on the side of the body member opposite the gauging head, a screw threaded stud extending through the slot and connecting the said gauging head and handle, said head and handle being adjustable longitudinally in the slot by loosening the connection between the two, the body member and head having indicia thereon by means of which the position of the head may be accurately determined for brakes of different diameters.

2. A gauge device for use in adjusting the brakes of automotive vehicles, comprising a body member adapted to be rotatably mounted upon a wheel spindle, means carried by the body member and which projects over the adjacent brake band, means for adjustably supporting the first named means on the body member, an indicator carried by the first named means, and a separate reciprocable plunger carried by the first named means adapted to engage the brake band and operative upon the indicator whereby irregularities in the brake band adjustment are indicated upon rotation of the body member.

3. A tool for gauging vehicle brake bands, comprising a bearing-like member adapted to be journaled upon a wheel spindle, an arm rigid with the bearing-like member and extending radially therefrom, said arm being provided with an elongated slot extending longitudinally thereof, the walls of the slot being provided with guideways near one side of the arm, a gauging head having portions engaging in the guideways and reciprocable longitudinally on said arm, said gauging head including a gauging member projecting axially over the adjacent brake mechanism, a combined handle and nut positioned on the opposite side of the arm from the gauging head, and a stud extending through the slot and connected to the head and combined nut and handle, one of said connections being screw threads.

4. A tool for gauging vehicle brake bands, comprising a bearing-like member adapted to be journaled upon a wheel spindle, an arm rigid with the bearing-like member and extending radially therefrom, said arm being provided with an elongated slot extending longitudinally thereof, the walls of the slot being provided with guideways near one side of the arm, a gauging head having portions engaging in the guideways and reciprocable longitudinally on said arm, said gauging head including a gauging member projecting axially over the adjacent brake mechanism, a combined handle and nut positioned on the opposite side of the arm from the gauging head, and a stud extending through the slot and connected to the head and combined nut and handle one of said connections being screw threads, a projection carried by the gauging head, and said arm having a plurality of recesses adapted to receive the projection for positioning the head in various longitudinal positions on said arm.

In testimony whereof we affix our signatures.

ALVIN L. MILLER.
RUSSELL H. MILLER.